INVENTORS
Henri de France and Rene Bocquel
BY
Bailey, Stephens & Huettig
ATTORNEYS INVENTORS
Henri de France and Rene Bocquel
BY
Bailey, Stephens & Huettig
ATTORNEYS Patented May 12, 1953 2,638,498

UNITED STATES PATENT OFFICE 2,638,498

TELEVISION RECORDING

Henri de France and René Bocquel, Paris, France, assignors to Society: "Tele-Industrie," S. A. R. L., Paris, France, a society of France Application April 6, 1949, Serial No. 85,928
In France April 10, 1948

3 Claims. (Cl. 178—5.4)

The present invention relates to devices for cinematographic recording and it is more particularly but not exclusively concerned with devices for the obtainment of color films and also for faking purposes.

The chief object of our invention is to provide a device of this kind which is better adapted to meet the requirements of practice than those existing up to this time, and in particular which permit color cinematographic recording with low illumination.

According to our invention, such a cinematographic recording system, which comprises a television transmitter and receiver system and cinematographic cameras for photographing the receiver screen of said television system, is characterized in that the scanning means at the television receiver are arranged successively and recurrently to register on a limited number of distinct fixed elemental areas of the receiver screen, this number being smaller than the number of scanning elements, in one frame, at the transmitter, the whole of the video signals of every frame divided into a succession of groups corresponding each to a picture elemental area adapted to fit on one of said receiver screen elemental areas, the number of cinematographic cameras being equal to the number of elemental areas of said receiver screen, and that said elemental areas of the receiver screen are separately projected on the films of said cameras, respectively, through suitable optical means.

Preferred embodiments of the present invention will be hereinafter described with reference to the accompanying drawings, given merely by way of example and in which:

Figs. 1 and 2 diagrammatically show optical devices adapted to permit separate cinematographic reproduction, from a television receiver tube, of three portions of a subject to be filmed;

According to a first embodiment of our invention, in which it is applied to color cinematographic recording, we make use of a television transmitter-receiver system which effects a polychromatic selection of the scene to be recorded, in order to decompose the picture into monochromatic elements and these monochromatic elements are recorded on distinct cinematographic films.

Concerning first said television transmitter-receiver system, we may, in the known manner, combine with the television camera a disc including several colored sectors and rotating in synchronism with the scanning device of the analyzer. In order to obtain a three-color decomposition of the image, we may use a rotary disc including three sectors which are respectively blue, red and green. On the other hand, we make use of a television receiver tube which shows, on a limited number of fixed distinct elemental areas of the fluorescent screen, successive portions of the picture that is transmitted, the number of elemental areas of the receiver screen being smaller than the number of picture portions so that the picture portions are successively and recurrently registered on said receiver screen elemental areas. Said areas may advantageously consist of three rectilinear segments, corresponding each to one of the colors of the three-color decomposition.

Preferably, we proceed in such manner that scanning at the receiver tube takes place successively on three distinct lines such as *a*, *b*, *c* (Fig. 1), so that, supposing for instance the case of a 500 lines analysis at the transmitter, lines 1, 2, 3 appear successively and respectively at *a*, *b*, *c*, then the next lines 4, 5, 6 again at *a*, *b*, *c*, respectively, and so on. Of course it should be well understood that this arrangement is in no way limitative. In the case it is adopted, the speed of the above mentioned colored disc is made such that, if it includes three colored sectors, it makes one revolution for three lines of analysis.

In order to obtain such a scanning at the receiver tube, we may use any suitable devices for controlling horizontal and vertical scanning.

For the horizontal scanning, the usual devices may be adopted, with saw-tooth oscillations the beginning and end of which are determined by the line synchronizing pulses transmitted by the transmitter, these oscillations being applied to suitable deflecting electrodes.

Figures 3, 4:
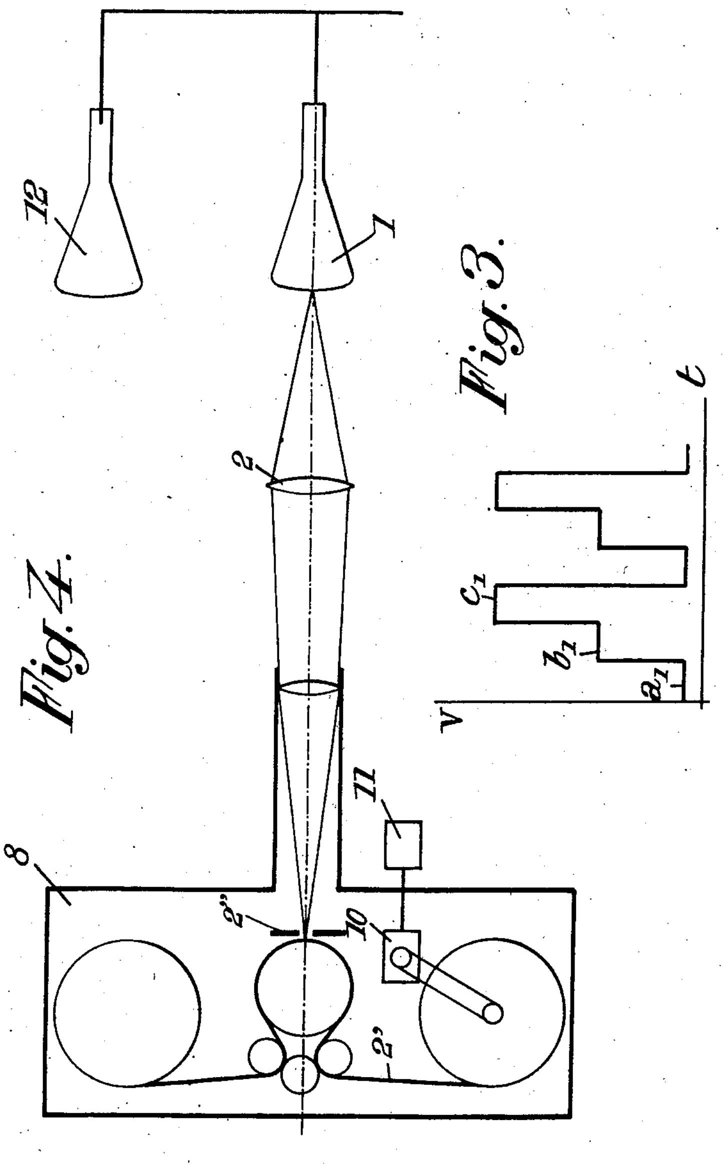
Fig. 3 is a curve representing relaxation oscillations capable of reproducing an image on a television receiver tube, in the form of successive lines traced at three fixed places.
Fig. 4 is a diagram showing a uniform unwinding cinematographic camera, adapted to be used for reproducing a televised image.

For the vertical scanning, that is to say that intended to cause the beam to pass from line *a* to line *b*, then from line *b* to line *c*, and to return to line *a*, we may use devices analogous to those adopted for vertical scanning in television receivers, with the difference that the relaxation voltages to be applied to the corresponding deflecting electrodes, instead of consisting of continuous saw teeth which ensure continuous passage from one line to the next one for the whole of the lines of every complete frame, have a stepped wave-form such as that shown by Fig. 3, in which the successive steps $a_1$, $b_1$, $c_1$, are intended to ensure line scanning respectively and successively on lines *a, b, c,* with subsequent return to line *a*. It will be easy for anyone skilled in the art to provide relaxator devices capable of transmitting stepped voltages of this kind. In all cases, these devices shall have to be synchronized with the line scanning, either by means of the above mentioned line synchronizing pulses or by means of another series of frame synchronizing pulses which would be capable of providing a relation of rigorous correspondence between horizontal and vertical scanning. For instance, we might have recourse, for obtaining voltages such as $a_1$, $b_1$, $c_1$, to three distinct bias devices which would be successively caused to act by means of a suitable electronic switch, synchronized by means of synchronizing pulses, as above mentioned.

What precedes would remain true if, instead of having scanning lines *a, b, c* corresponding with three successive lines of analysis, any other order of correspondence between these two kinds of lines were used, as it will be seen hereinafter.

Being given such a system, separation of the three above mentioned segments or lines *a, b, c* from one another is ensured by means of a suitable optical device which causes them to be received separately on three distinct films which are run with a continuous movement, this movement being synchronized, through any suitable means, making use in particular of one or the other of the two types of above mentioned pulses, so that every complete scanning of a televised picture corresponds to the passage of an elementary picture on each of the cinematographic films.

Such an optical system can be constituted by means already known in themselves and in particular by combinations of mirrors, prisms, lenses and masks, that is to say screens stopping at least a portion of the light beam.

Figure 1:
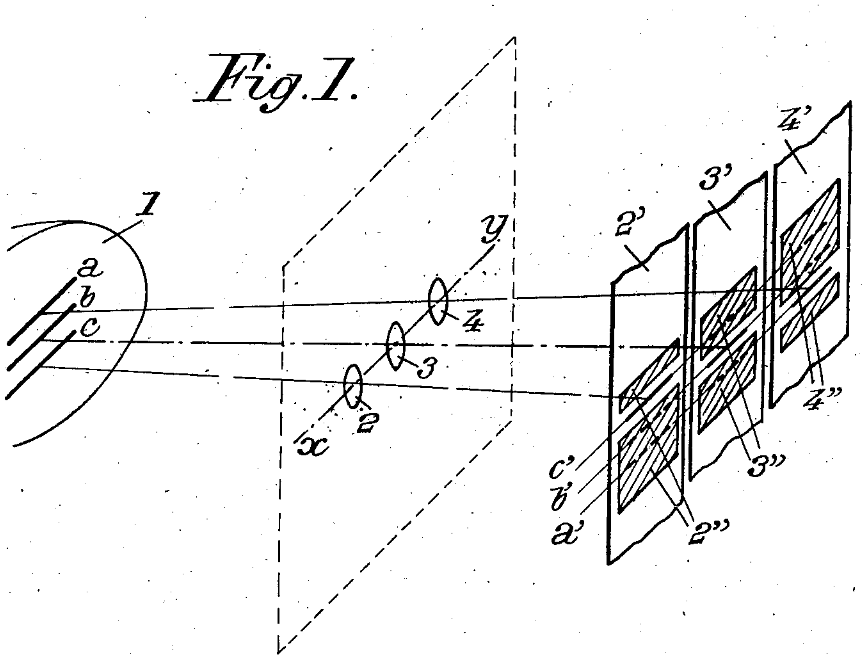

According to a particularly simple embodiment, such an optical system is constituted as diagrammatically shown by Fig. 1. On the screen 1 of a television receiver tube, the lines corresponding to the scanning of the subject to be filmed, respectively for blue, red and green, appear successively at fixed places *a, b* and *c*. Three objective lenses 2, 3 and 4 give each an image *a', b', c'* of the optical object *a, b, c,* respectively on areas along which cinematographic films 2', 3', 4' are passing respectively. Each of these films is partly protected against the action of the light beam by masks 2'', 3'' and 4'', arranged in such manner that only one of the three segments *a', b', c'* can be recorded. It follows that the televised lines appearing at *a'* and corresponding for instance to the blue color of the subject to be filmed, act only on film 4''; likewise, the lines appearing at *b'* and corresponding for instance to the red color act only on film 3'', whereas the lines appearing at *c'* and corresponding to the green color, act only on film 2''.

It is, of course, possible to use the monochromatic films 2', 3' and 4' subsequently for reconstituting the initial color of the subject filmed, by combining the pictures given by each of these three films, either during their projection on a screen, or by preliminary combination into a single film, or in any other known manner.

In what precedes it was supposed that the invention is applied to color cinematography. But other applications are possible, for instance for the obtainment of cinematographic fakes.

For this purpose, we arrange a television transmitter-receiver system in such manner that the lines corresponding to analysis of the subject to be filmed appear successively on the receiver tube screen on a restricted number of elemental areas, for instance along three segments *d, e, f,* each of the three groups of lines that appear respectively on one of the segments *d, e,* or *f* corresponding to a given zone of the subject to be filmed, and for instance to the head, the body and the legs of a personage. It will be seen that, in this case, correspondence of the successive scanning lines *a, b, c,* at the receiver with analysis at the transmitter can be made quite different from that above described for color recording.

We then distribute on a plurality of cinematographic films, and preferably, in the example chosen, on three films 5', 6' and 7', the images *d', e'* and *f'* obtained through three objective lenses 5, 6 and 7 and we redistribute images *d', e'* and *f'* on these films according to any arrangement as may be desired.

Figure 2:
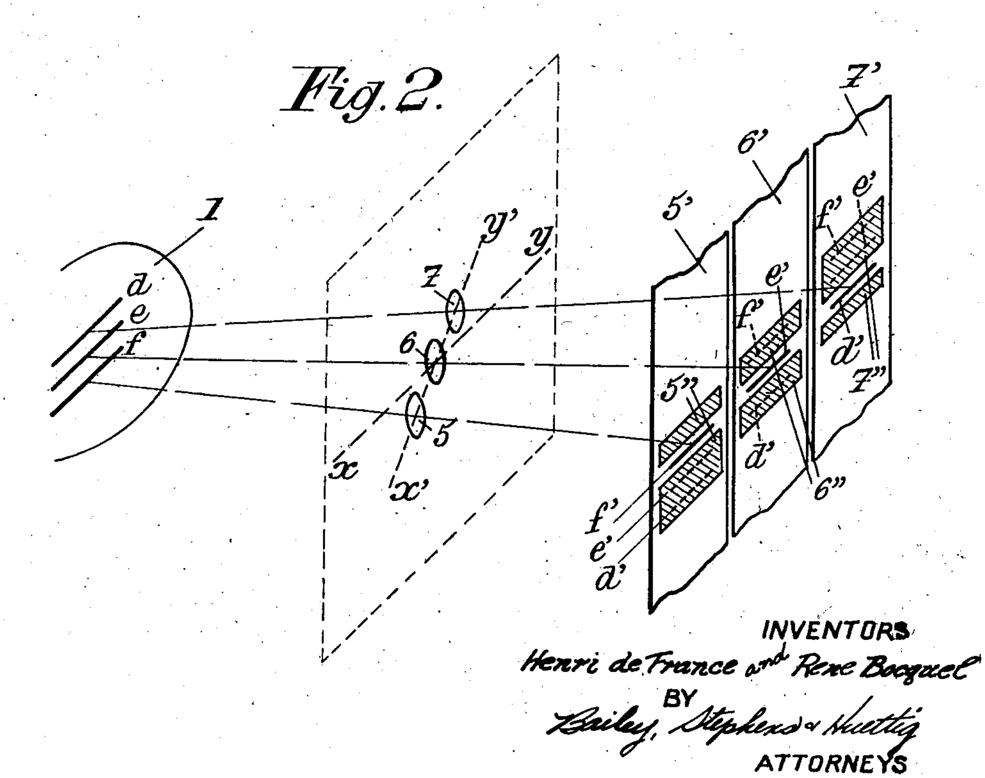

On Fig. 2, which shows the same general arrangement as Fig. 1, we have thus illustrated a system of objectives constituted by lenses placed in a plane perpendicular to the axis of oscilloscope 1 and more particularly along a line *x' y'* of this plane oblique with respect to the direction *x y* of segments *d, e* and *f*. It results from the arrangement adopted in this case that image *d'* appears on film 7' at the same level as image *e'* on film 6' and image *f'* on film 5'. We provide masks 5'', 6'' and 7'' for hiding on each film the images to be eliminated.

We thus obtain, on each of the films 5, 6 and 7 a picture which corresponds respectively to each of the zones limited on the subject to be filmed. It will be understood that, in these conditions, the combination of the three films 5, 6 and 7 permits a great number of fakings of all kinds.

Fig. 4 shows, for one of the cinematographic cameras, designated by reference numeral 8, how the film 2' can be unwound in a continuous manner.

Film 2' is to be unwound at a rate synchronized with the rate of analysis of the televised subject so that a length of the film equal to the height of a cinematographic frame passes before the camera objective while a whole television frame is being analyzed. For this purpose, the motor 10 of the camera is controlled through an electronic device 11 operated by the vertical scanning pulses. It will be understood that, in these conditions, each of the lines resulting from television analysis will be recorded on the film at successive adjoining places.

The above device is advantageously completed by a receiver tube of the usual type in television, to enable an operator to check up the quality of the televised record. Advantageously we correct the slight deformation which would result from the unwinding of film 9 during the scanning of a televised line by slightly inclining one of the two apparatus—cinematographic camera or oscilloscope—with respect to the other. Finally, every precaution is taken so that the device constituted by the two last mentioned apparatus is free from internal vibrations, in particular by placing these two apparatus on the same frame sufficiently insulated from the mechanical point of view.

Anyway, such a device has many advantages, in particular: that of permitting the use of recording cinematographic apparatus which are simplified in that they do not require periodical stopping means; that of reducing to a very low value the differences between the three elementary film pictures; that of considerably reducing the size required for the fluorescent screen that is used, the dimensions of which may be restricted approximately to those of some lines; that of permitting color recording with a low illumination of the scenes to be filmed; and that of permitting a great number of fakes.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A cinematographic recording device which comprises, in combination, a single television receiver including a cathode ray tube having a screen, horizontal scanning means for moving the cathode ray beam of this tube with a reciprocating motion to form television lines on said screen, vertical scanning means including a relaxation oscillation generator giving, for every frame scanning, a number of successive identical stepped wave-forms smaller than the number of television lines per frame for distributively positioning the successive television lines of every frame received on this screen on a number of fixed line positions on said screen equal to the above mentioned number so that the sets of television lines reproduced on these fixed line positions respectively are interlaced in every frame, a number of cinematographic cameras equal to said number of fixed line positions, every camera including a moving film, and optical means between said screens and said cameras for projecting only one of said line positions on each of said camera films, respectively.

2. A cinematographic recording device which comprises, in combination, a single television receiver including a cathode ray tube having a screen, horizontal scanning means for moving the cathode ray beam of this tube with a reciprocating motion to form television lines on said screen, vertical scanning means including a relaxation oscillation generator giving, for every frame scanning, a number of successive identical stepped wave-forms smaller than the number of television lines per frame for distributively positioning the successive television lines of every frame received on this screen on a number of fixed line positions on said screen equal to the above mentioned number so that the sets of television lines reproduced on these fixed line positions respectively are interlaced in every frame, a number of cinematographic cameras equal to said number of fixed line positions, every camera including a moving film, and optical means between said screens and said cameras for projecting only one of said line positions on each of said camera films, respectively, said cameras being of the continuous film motion type, without successive temporary stoppage for the recording of every frame.

3. A cinematographic recording device which comprises, in combination, a single television receiver including a cathode ray tube having a screen, horizontal scanning means for moving the cathode ray beam of this tube with a reciprocating motion to form television lines on said screen, vertical scanning means including a relaxation oscillation generator giving for every frame scanning three successive identical stepped wave-forms, for distributively positioning the successive television lines of every frame received on this screen on three fixed line positions on said screen recurrently so that the first television line is reproduced on the first line position on the screen, the second television line on the second line position, the third television line on the third line position, the fourth television line on the first line position, the fifth television line on the second line position, the sixth television line on the third line position and generally every set of three consecutive television lines on said three line positions, the sets of television lines thus reproduced on said fixed positions respectively thus belonging to three interlaced fields of the frame, three cinematographic cameras including each a moving film, and optical means between said screen and said cameras for projecting only the first line position of said screen on one of said cameras, only the second line position of said screen on another of said cameras and only the third line position of said screen on the third of said cameras.

HENRI DE FRANCE.
RENÉ BOCQUEL.

References Cited in the file of this patent

UNITED STATES PATENTS

| Number | Name | Date |
|---|---|---|
| 1,839,361 | Weaver | Jan. 5, 1932 |
| 2,185,806 | Finch | Jan. 2, 1940 |
| 2,200,285 | Lorenzen | May 14, 1940 |
| 2,259,884 | Goldsmith | Oct. 21, 1941 |
| 2,275,898 | Goldsmith | Mar. 10, 1942 |
| 2,294,820 | Wilson | Sept. 1, 1942 |
| 2,296,908 | Crosby | Sept. 29, 1942 |
| 2,389,646 | Sleeper | Nov. 27, 1945 |
| 2,525,891 | Garman | Oct. 17, 1950 |
| 2,531,031 | De France | Nov. 21, 1950 |
| 2,567,240 | Sites | Sept. 11, 1951 |

FOREIGN PATENTS

| Number | Country | Date |
|---|---|---|
| 390,158 | Great Britain | Mar. 28, 1933 |